Nov. 6, 1934.        W. S. LAWRENCE ET AL        1,979,331
METHOD OF MARKING MATERIALS
Filed April 15, 1931        2 Sheets-Sheet 1
Fig:1.
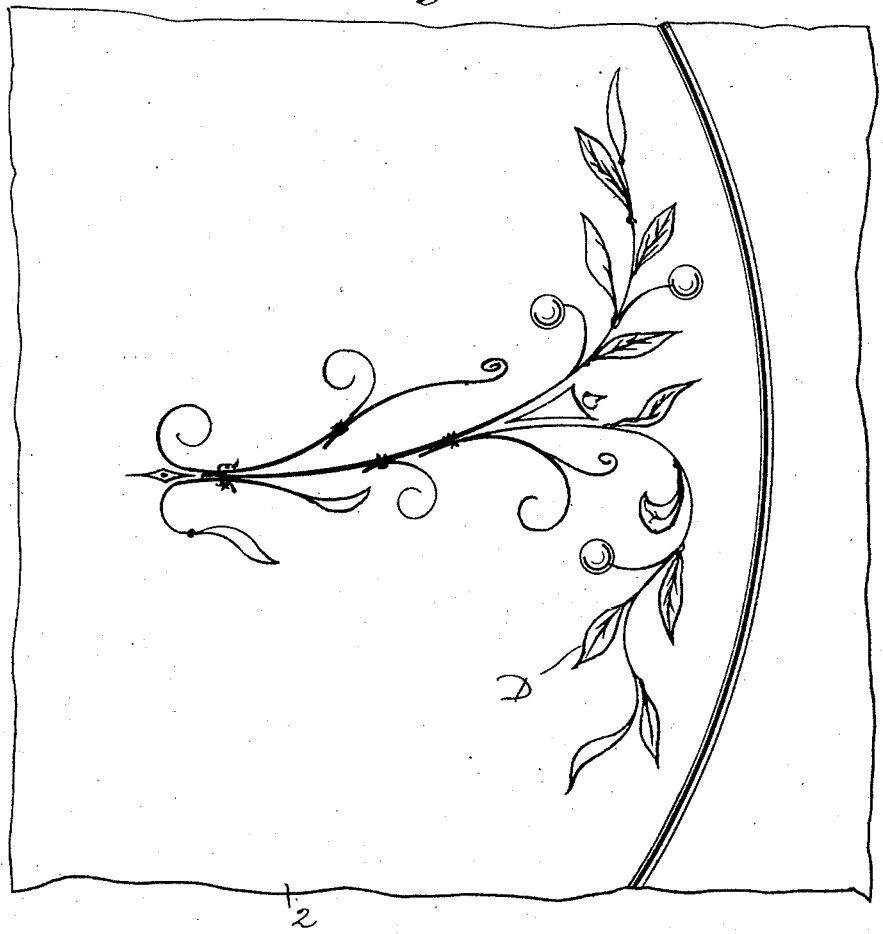
Fig:2.
INVENTORS
Winthrop Stanley Lawrence
Vladimir Tuma
Ira F. B. Hutton
BY
Mock & Blum
ATTORNEYS.

Nov. 6, 1934. W. S. LAWRENCE ET AL 1,979,331
METHOD OF MARKING MATERIALS
Filed April 15, 1931  2 Sheets-Sheet 2
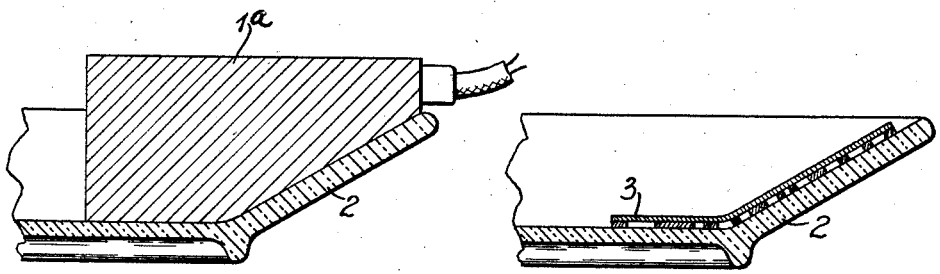
Fig: 3.   Fig: 4.
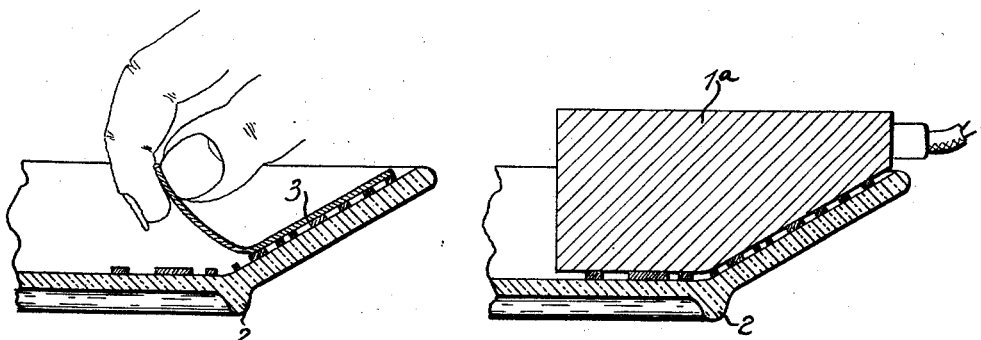
Fig: 5.   Fig: 6.
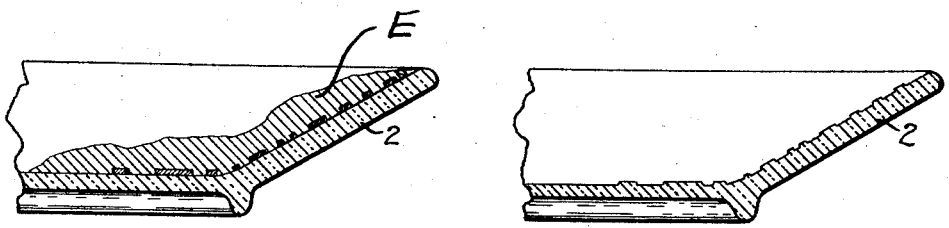
Fig: 7.   Fig: 8.
Winthrop Stanley Lawrence
Vladimir Zunfa
Ira F. B. Hutton
INVENTORS
BY Mock & Blum
ATTORNEYS Patented Nov. 6, 1934

1,979,331

UNITED STATES PATENT OFFICE 1,979,331

METHOD OF MARKING MATERIALS

Winthrop Stanley Lawrence, Rego Park, Vladimir Tuma, Astoria, and Ira F. B. Hutton, Woodhaven, N. Y., assignors to Kaumagraph Company, New York, N. Y., a corporation of New York Application April 15, 1931, Serial No. 530,445

1 Claim. (Cl. 41—33)

Our invention relates to a new and improved method of marking materials.

One of the objects of our invention is to provide a new and improved method for marking articles made of glass, synthetic resins of the condensation type and other objects which are molded either with or without the use of pressure, including porcelain.

Another object of our invention is to provide a method of marking hard objects made of layers or laminations, and in particular articles of this type which are made either wholly or partially from synthetic resins of the condensation type.

Another object of our invention is to provide a new and improved method of applying a transfer, in order to facilitate the ready identification or marking of objects of the type above described, and which have been either molded into shape or which have been formed from layers of material.

Another object of our invention is to provide a method whereby a transfer is used in order to apply a marking of any type to the surface of such an article, said marking serving as a resist to the action of an etching material, and/or a coloring material.

Another object of our invention is to provide an improved method for providing a clear and bright marking.

Another object of our invention is to provide an improved method of coloring the etched or unetched portions of the surface of the object in order to provide a contrasting marking.

Other objects of our invention will be set forth in the following description which illustrates a preferred embodiment thereof, it being understood that the above general statement of the objects of our invention is intended to generally explain the same and not to limit it in any manner.

According to our invention a resist marking of any type is formed upon the surface of the article as by means of a heat transfer. This heat transfer is of the type in which a resist marking is printed by means of a fusible marking composition, upon a paper transfer base. If the resist marking, design or the like has been printed upon the transfer strip, the surface of the object is etched by means of a suitable etching material or composition. Instead of using an etching composition, the object may be colored by means of coloring material which can react with the object or which can adhere to the object.

Fig. 1 is a plan view of a decorated object.

Fig. 2 is a sectional view of Fig. 1, showing how the transfer 3 is pressed against said article 2, by means of a pad 1.

Fig. 3 shows how the surface of article 2 is heated by heating device 1a.

Figs. 4 and 5 show how the transfer 3 is applied to the heated surface, and how the paper ribbon base of the transfer is peeled off.

Fig. 6 shows the reheating of the decorated surface.

Fig. 7 shows the application of the etching material E.

Fig. 8 shows the completed surface of the article 2.

According to our invention the object to be marked is heated to the required temperature, the transfer is applied to the heated surface to be marked so that the marking on said transfer contacts with said heated surface, and the transfer is then pressed against said heated surface by means of a pressing tool which is preferably semi-rigid. This pressing tool may be a very tight wad of cloth and this pressing tool may be either at room temperature or it may be heated to the proper temperature. We have found that this is much more satisfactory than using a rigid pressing tool, such as a flatiron, either hot or cold.

The fusible marking on the transfer may be made of any resist composition which is softened or fused, either partially or wholly by the action of heat, and which can adhere to the surface to be marked.

After the transfer marking has been applied, the object to be marked is allowed to cool to room temperature or to such temperature as will permit the removal of the paper base of the applied transfer. This paper base is merely pulled away from the surface to be marked, and to facilitate this, the paper base may be saturated with water.

If the surface to be marked is to be treated with an etching material, it is not necessary to remove the paper base of the transfer. The etching material or agent may be applied directly to the paper, which is totally destroyed by the action of the etching agent, leaving the resist mark on the surface to be marked.

If the paper base of the transfer is removed, the adhering resist mark is often somewhat rough in its texture and somewhat dull in appearance. The appearance of this mark can be considerably improved by reheating the marked object until the objectionable rough and dull appearance has disappeared, either totally or partially. This second heat treatment not only improves the appearance of the marking but also decidedly improves the resist quality of the marking. However, we do not wish to be limited to this second heat treatment.

In order to illustrate the invention, without limiting the same to the examples given herein, the following composition may be used for marking the surface of an article made of a condensation resin:—

|  | Parts by weight |
|---|---|
| Orange shellac | 55 |
| Rosin | 30 |
| Lindol | 30 |
| Cadmium selenide | 36 |

The same composition can be used for marking a glass surface, including the surface of a hand-blown glass article. The major use of our invention is for marking articles made of condensation resins.

The name "Lindol" refers to tri-cresyl phosphate.

After the surface has been suitably marked, the etching agent or material is applied to the predetermined area of the surface which is defined or protected by the transfer marking. This etching agent is allowed to remain in contact with said surface until a sufficient etching has been secured. The etching agent is then removed by means of water or any other suitable means that will remove all traces of the etching agent without removing the applied marking. If it is not desired to color the etched area or marking, the etched agent may also be removed by any suitable means which will also dissolve the applied marking. However, we prefer to remove the etching agent without simultaneously removing the applied resist marking, so that if the applied marking is to be removed, this is subsequently done.

The choice of an etching agent or material necessarily depends upon the surface to be marked. For example, the mineral acids, such as sulphuric acid, are very effective for etching objects which are molded and/or fabricated either wholly or partially from resins, such as synthetic resins and various condensation products. For etching surfaces made of glass or porcelain, hydrofluoric acid is effective. A concentrated sulphuric acid of 1.84 gravity is most suitable for etching surfaces made of the synthetic resins and various condensation products.

The use of a concentrated mineral acid is disadvantageous because it is often very difficult and at times even impossible, to confine the action of the etching agent within the desired area or areas, especially if the surface to be marked is not a flat surface.

We therefore prefer to thicken the etching agent so as to produce a paste and to utilize this etching paste for producing the marking defined by the transfer marking. This makes it possible to have absolute control of the etching process, even when non-planar surfaces are being etched.

In order to produce an etching paste from a material such as a mineral acid, it is sufficient to intermix the acid with a substance which is wholly or partially inert with respect to the etching agent.

For example, we can form a paste from 100 parts (by weight) of concentrated sulphuric acid, and 8 parts (by weight) of carbon black. In another composition the 8 parts of carbon black are replaced by 70 parts of titanium oxide. Of course these pastes may be made of varying consistency. It is merely necessary to add the wholly or partially inert ingredient or ingredients to the etching agent and then thoroughly intermix the materials until a smooth paste of the desired consistence has been obtained.

While we prefer to use an etching paste, instead of a liquid etching agent, we do not wish to be limited to the use of a paste.

After the etching operation has been completed, the applied transfer marking may be removed by the use of a suitable solvent such as carbon tetrachloride, acetone, and trichlorethylene. However, it is not necessary to remove the applied marking and if the etched area or areas is to be colored, it is desirable not to remove the applied marking. After the etching operation has been completed, the applied marking is often somewhat rough and dull. It is therefore desirable to reheat the marked object until the roughness and dullness have disappeared, either totally or partially. These reheating operations are carried out by gradually increasing the temperature of the air of the room or chamber in which the objects are located until the desired improvement in appearance has been secured, or else the object may be placed in an oven which is heated to the proper temperature.

The reheating operation, after the etching operation, not only improves the appearance of the applied marking, but also decidedly improves the resist qualities of the applied marking, against the action of the coloring agent or agents.

If it is desired to remove the applied resist marking, this can be done by mechanical means which do not exert an objectionable action upon the marked surface. Likewise, the applied marking can be softened by heating the marked object, before removing the applied marking by mechanical means. However, we prefer to use solvents.

The contrast between the etched and unetched portions of the surface of the marked object may be improved greatly by coloring the etched portions of the surface of the marked object. This contrasting color effect may be accomplished by applying suitable dyes to the etched portions of the surface of the marked object. These dyes color said etched portions directly and more or less permanently. The contrasting color effect may also be accomplished by the application of suitable dyes to the etched portions, with a subsequent application of a "fixing agent" so that the etched portions are colored more or less permanently. The contrasting coloring may also be accomplished by applying various substances which will react directly with the material of the object, thus producing a more or less permanent color. The contrasting coloring may also be accomplished by applying various substances which will adhere more or less permanently to the etched area or areas, the applied substances being treated with other substances, in order to produce a reaction which will produce a more or less permanent color.

For example, in coloring the etched areas of surfaces made of various synthetic resins and condensation products, we can use basic fuchsine and malachite green. These substances are particularly useful for marking certain synthetic material which is sold under the trade name of "Beetleware", and which is made from urea condensation products. This material is a thiourea resin, and is well known. The basic fuchsine is triamino-tolyl-diphenyl-carbinol. The malachite green is essentially a salt of tetramethyldiaminotriphenyl carbinol. It usually appears in commerce as the zinc or iron double chloride.

Likewise, potassium permanganate is a substance which will directly and more or less permanently color objects made of various synthetic resins or condensation products by directly reacting with the material. Since these resins or the like are organic products, the potassium permanganate is reduced to manganese dioxide which is deposited in a soluble form, in the etched surface. Likewise, water-soluble lead salts and water-soluble cadmium salts are substances which adhere more or less permanently to the surface of the object to be marked and the layers thus formed can be subsequently treated by substances such as ammonium polysulphide or hydrogen sulphide. As examples of such lead salts, we specify the following:—

Lead acetate, lead nitrate.

As examples of such cadmium salts, we specify the following:—

Cadmium chloride, cadmium nitrate, cadmium sulphate.

For marking the etched area of an object made of a condensation resin, glass, porcelain, etc., we prefer to use sodium silicate solutions colored by means of inorganic salts and/or organic dyes and/or pigments. We can also use lacquers and varnishes and in particular, nitrocellulose lacquers.

If dyes such as basic fuchsine are used, they are applied to the etched areas in paste form, as later described.

The use of most coloring agents such as a solution of potassium permanganate is difficult because the coloring agent is not confined within the desired area, especially if a non-planar surface is being treated.

However, we have discovered that the coloring agents may be successfully thickened by the addition of a sufficient quantity of a substance which is wholly or partially inert to the action of a coloring agent.

For example, a coloring paste may be made of the following:—

| | Parts by weight |
|---|---|
| Water | 100 |
| Potassium permanganate | 4 |
| Titanium oxide | 120 |

The consistence of a coloring paste may be varied within wide limits. A coloring paste of this kind can be very readily prepared by producing a smooth mixture of the inert ingredient with the coloring agent, or with a solution of the coloring agent.

While we prefer to use a coloring agent in paste form, we do not wish to be limited thereto. If the coloring agent is to be applied in paste form, we have found it preferable to first apply the necessary quantity of coloring paste and to then allow the paste to completely dry either in the air at room temperature, or by placing the object in a suitably heated oven. The coloring action is strongest during this drying period. While the speed of drying of the paste may vary within extremely wide limits, we have found that comparatively slow drying produces more uniform results than a rapid rate of drying. For example, the drying period may be five minutes, at 110° C.

After the coloring agent has produced the desired coloring effect, it may be removed with the aid of water or any other suitable solvent, thus leaving the applied transfer marking on the surface. Likewise, we may utilize a solvent which also removes the applied marking, thus leaving the surface of the marked object free of any marking save that which is produced by the etching and/or coloring. Likewise, the coloring agent and/or the applied marking may be removed by any mechanical means which will not exert an objectionable effect upon the marked surface.

While we have specified the preferred embodiments of our invention, it is to be understood that the sequence of the steps may be materially changed, and that some of the steps may be entirely omitted. For example, some objects may be colored by means of the coloring agents above specified, and without using the etching operation. For example, such objects are as the synthetic resin articles sold as "Durex". "Durex" is a condensation resin of the phenol-formaldehyde type.

If the etching process is omitted, the contrast is much less striking due to the fact that surfaces of the type specified usually are glazed and relatively impenetrable.

Likewise, the etched object may be colored even if the applied marking is removed prior to the application of the coloring agent, but the results are not as satisfactory as when the applied marking is permitted to remain on the marked object in order to confine the coloring agent in the designated area or areas.

It is to be understood that the applied marking which is produced according to our process is a surface marking which is raised relatively to the surface of the object, and that this surface marking defines a predetermined area or areas, so as to confine the action of the etching agent, the action of the coloring agent, etc. For this purpose the thickness of the applied marking should be about .003 of an inch to .02 of an inch.

Instead of etching and coloring the object in two separate steps, these steps may be combined by using an agent which produces an etching action and also a coloring action. Such an agent may be silver nitrate as applied to synthetic resin articles of the type sold as "Beetleware".

The silver nitrate may be applied in the form of a solution whose concentration may be between 5% and 1%. When the silver nitrate solution is used, the metallic silver is deposited in finely divided form.

The potassium permanganate and the silver nitrate can be used on the "Beetleware".

We claim:

A method of marking a hard impenetrable material which consists in heating the surface to be marked, applying to said heated surface a transfer of the heat type and comprising a paper base having a marking composed of material which is softened by the action of heat, removing the paper base while leaving said marking on said surface, reheating the surface to be marked and the marking applied thereto, said marking defining a predetermined area or areas, and then marking said enclosed area or areas by means of a marking composition which has substantially no action upon said resist marking.

WINTHROP STANLEY LAWRENCE.
VLADIMIR TUMA.
IRA F. B. HUTTON.